United States Patent [19]

Bass et al.

[11] Patent Number: 4,701,851

[45] Date of Patent: Oct. 20, 1987

[54] COMPOUND WORD SPELLING VERIFICATION

[75] Inventors: Vance R. Bass, Austin; Veronica A. Bonebrake, Leander; David A. Garrison; James K. Landis, both of Austin, all of Tex.; Mary S. Neff, Montrose, N.Y.; Robert J. Urquhart; Susan C. Williams, both of Austin, both of Tex.

[73] Assignee: International Business Machines Corporation, Armonk, N.Y.

[21] Appl. No.: 664,183

[22] Filed: Oct. 24, 1984

[51] Int. Cl.$^4$ .......................... G06F 15/38; G06G 7/60
[52] U.S. Cl. ...................................... 364/419; 369/83; 400/63
[58] Field of Search ...................... 364/419, 900, 200; 369/83; 400/63

[56] References Cited

U.S. PATENT DOCUMENTS 4,158,236  6/1979  Levy ................................... 364/419
4,342,085  7/1982  Glickman et al. ................. 364/200

FOREIGN PATENT DOCUMENTS 0080045  6/1983  European Pat. Off. .
0083393  7/1983  European Pat. Off. .
0091478  5/1985  Japan .................................. 364/419

OTHER PUBLICATIONS

8070 Communications of the ACM, vol. 23, No. 12, Dec. 1980, pp. 676-687, James L. Peterson, "Computer Programs for Detecting and Correcting Spelling Errors".

Patents Abstracts of Japan, vol. 7, No. 6, Jan. 11, 1983, "Electronic Dictionary".

IBM Technical Disclosure Bulletin, vol. 27, No. 1A, Jun. 1984, V. R. Bass et al., "Virtual Blank for Spelling Aid Programs".

Primary Examiner—E. A. Goldberg
Assistant Examiner—Lincoln Donovan
Attorney, Agent, or Firm—Douglas H. Lefeve

[57] ABSTRACT

A compound word spelling verification technique is described for use with a dictionary which does not include all verifiable compounds. During attempted verfication of a text word, all initial substrings of the word found in the dictionary are saved in a list. If the entire word is not found in the dictionary, the longest substring in the substring list is subtracted from the entire word to be verified to yield a "remainder" portion of the input text word. The dictionary words are then compared with this remainder portion to determine if a match occurs. If so, then both portions of the word are found in the dictionary and spelling of the word is considered correct. If the remainder is not found in the dictionary, successively shorter initial substrings are accessed to yield successively longer remainders. The word is considered correctly spelled if both a substring and a remainder are found in the dictionary. This techinque is applied recursively so that multiple-piece compounds can also be found.

9 Claims, 2 Drawing Figures

COMPOUND WORD SPELLING VERIFICATION

CROSS-REFERENCE TO RELATED APPLICATION

U.S patent application Ser. No. 664,184, now U.S. Pat. No. 4,672,571, to V. R. Bass et al, filed Oct. 24, 1984, entitled "Compound Word Suitability for Spelling Verification", and assigned to the assignee of this invention.

TECHNICAL FIELD

This invention relates to spelling verification in general, and more particularly to spelling verification of compound words by reference to a data base which does not include all verifiable compounds.

BACKGROUND ART

When the spelling of compound words has been automatically verified by word processing systems, one of two techniques has been utilized. With one prior art technique, all compound words that the system is capable of verifying as correctly spelled are stored in a dictionary data base. The word to be verified (sometimes referred to as the input word) is compared against all words stored in the dictionary for a possible match. Utilizing the second prior art technique, the input word is parsed, or separated, into its constituent words. The constituent words are then used as input words to be compared against the words stored in the dictionary data base.

One of the obvious limitations of the first of the two prior art techniques described above is that of the memory size or storage space required to store a dictionary data base large enough to include all foreseeable compounds of words. In many languages, particularly in Germanic languages, word compounding is an active way of creating new words in these languages; therefore, storing all meaningful compounds in a dictionary data base is, quite simply, impossible.

Accordingly, the second prior art technique described above is the only meaningful way to achieve the greatest compound word verification potential, although the approach of parsing compounds into their constituent parts and verifying these parts has had several significant limitations in its operation.

One example of this parsing technology is found in the IBM Displaywriter TextPack 4 program which runs on the IBM Displaywriter System. With this spelling verification system, certain letter pairs were known to be most frequent at the "joint" between compound constituents, and these letter pairs could be used as clues to scanning a word for possible breaking points. For example, many English words end in the letter "t" and many words begin with the letter "s". Thus, the pair "ts" is a good candidate for a break point for parsing English compound words. The word in question is scanned and broken between each set of possible break points found in the word. Each resultant piece of the word is then compared to the words in the dictionary data base. Therefore, in attempting to verify the word "hotspot" as a correctly spelled word, the parser would find the "ts" break point, break the word in to "hot" and "spot" and would then find both of these parts in the dictionary. The word would then be judged correctly spelled, and on this basis could also be hyphenated between the constituents, e.g.—"hot-spot".

The problems of the approach described immediately above lie in the fact that likely break points are also common letter pairs at places other than the joints between compound constituents. This fact causes a number of serious flaws in the operation of such a method. In terms of system performance, since any unrecognized word must be parsed before it can be marked as misspelled, the parser must have a large number of break points in order to verify correct compounds. Thus, the identification of incorrect words is slowed down correspondingly, which degrades the performance of the system. Since compounding languages have longer average word lengths than non-compounding languages, the wasted time and effort expended in trying all of the "possible" combinations (according to an extensive break point list) can be considerable. For example, a comparable process in the English language might produce a word like "compoundwordspellingverification". The number of operations required to break a compound word of this length at all possible break points, look up the resultant constituents, and possibly apply another level of parsing to one of the pieces is clearly quite large.

The break point parsing technique described above sometimes becomes "confused" when several letters in the first part of a compound look like another good word. If the remainder of the compound cannot be found and the parsing algorithm does not successfully recover, a perfectly good word may be marked as misspelled, even though its constituents are in the dictionary.

A further limitation of the break point parsing technique described above involves hyphenation errors. If the parser is contributing information to an automatic hyphenation program, correctly spelled words may suffer from mishyphenation on the basis of break points when the wrong pair of words is identified as the constituents of a compound. For example, "snakeskin" might be incorrectly parsed as "snakes-kin", or "pantscuff" might be incorrectly parsed as "pant-scuff". This turns the word to apparent nonsense for a reader who tries to reconstruct it on the basis of its supposed hyphenation at the compound joint.

Accordingly, although it is preferred to use a parsing technique to verify compounds for spelling verification, rather than attempting to store all meaningful compounds in a dictionary (which is clearly impossible), it would be of great benefit to have available a high performance parsing algorithm which minimizes errors and allows verification of compound words not stored in the dictionary.

DISCLOSURE OF THE INVENTION

Accordingly, a technique is employed in parsing compound words in which the input word is matched against dictionary words to determine if substrings of the input word match with words in the dictionary. For the purposes of this description, unless otherwise specified, "substring" refers to an initial substring, meaning a sequence of text characters beginning with the first character of the input word and ending prior to the end of the input word. The remainder of the input word, beginning with the next character beyond the last character of the longest matching substring, is then compared with the dictionary. If it is not in the dictionary, the system recalls the next-longest substring and the remainder of the input word beyond this next-longest substring is tested for a match with the dictionary words.

In practice, for compound words the combination of the longest substring and the remainder of characters beyond the longest substring constitutes two words in the great majority of cases. This dramatically improves system performance by reducing the number of dictionary look-ups and also substantially lessens the number of verification and hyphenation errors. The modification of this technique which employs backing up from the longest substring to successively shorter substrings when the remainders are not found in the dictionary addresses those cases in which the combination of the longest substring and remainder do not verify as a compound word. Furthermore, this approach may be applied recursively to the remainder of the word in order to verify the spelling of words with more than two constituents.

The foregoing and other objects, features, extensions, and advantages of the invention will be apparent from the following more particular description of preferred embodiments of the invention, as illustrated in the accompanying drawing.

BEST MODE FOR CARRYING OUT THE INVENTION

Figure 1:
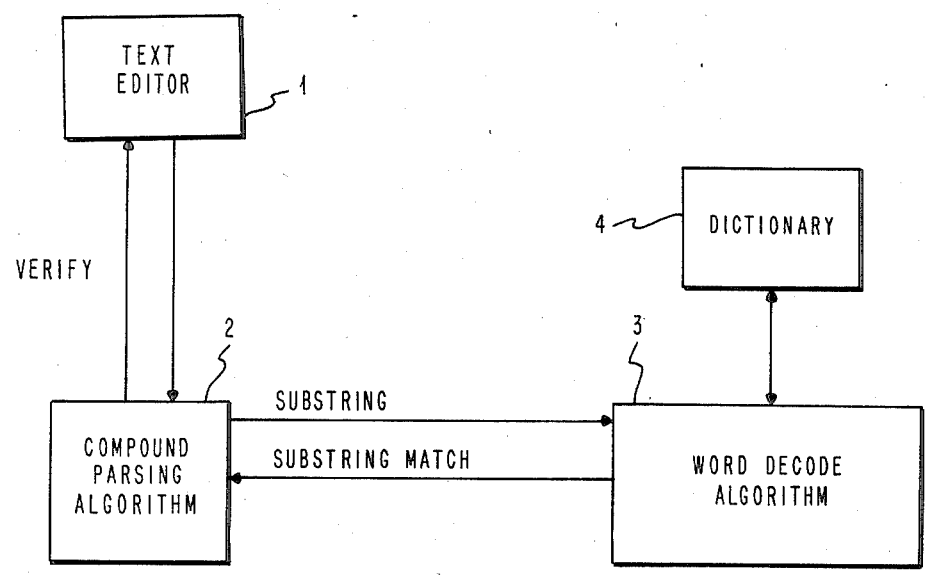
FIG. 1 is a block diagram of the data flow of the compound word spelling verification technique of this invention.

Referring to FIG. 1, a block diagram is shown of the data flow of the compound word spelling verification technique of this invention. This invention is used with a Text Editor 1 which may, for example, be an IBM Personal Computer running an IBM DisplayWrite program to enable the IBM Personal Computer to perform a variety of word processing tasks and applications. One of these word processing applications is "Spelling Tasks" which can be used to verify the spelling of words in a document. With this kind of word processing application, the words in a document are compared with a stored dictionary so that incorrectly-spelled words can be highlighted. Of course, many proper names and some other words are not ordinarily found in the dictionary, but one important operational goal is to have the system highlight as few correctly spelled words as possible.

When the compound word spelling verification technique of this invention is used in a "Spelling Tasks" application of a text editing system, the text editor program sends individual words to be verified to the Compound Parsing Algorithm 2. The word sent from the Text Editor 1 to the Compound Parsing Algorithm 2 for verification is conveyed along the Word or Substring line to the Word Decode Algorithm 3 for comparison with words stored in Dictionary 4. A logical point in the dictionary will be chosen to begin comparisons of the Dictionary 4 words with the word to be verified, as will be understood by those skilled in the art. For example, rather than starting at the beginning of the dictionary for each verification operation, the comparison process in the Dictionary 4 would begin with the words stored therein which begin with the same letter as the word to be verified. Further, performance considerations might dictate that the comparison process begin two or three characters into the word to be verified. In any case, one or more whole words may be found in Dictionary 4 which compare to the larger sequence of characters comprising the text word to be verified.

For example, in attempting to verify the word "overtime", the substring "over" will first be found followed by the substring "overt". The Word Decode Algorithm 3 conveys each of the substrings which match to the Compound Parsing Algorithm 2. With the technique of this invention, the remainder of the word following the longest substring is then conveyed back to the Word Decode Algorithm 3 for comparing to the words in Dictionary 4. Continuing with the "overtime" example, "ime" is sent back to the Word Decode Algorithm 3 for comparison with the words in Dictionary 4. In this comparison, the words in the Dictionary 4 beginning with i (and possibly those beginning with im) are accessed to determine if a comparison exists between the "remainder" substring in the word to be verified and the words in Dictionary 4. In this example, "ime" will not be found in the Dictionary 4 and this fact will be conveyed along the Substring Match line from the Word Decode Algorithm 3 to the Compounding Parsing Algorithm 4.

Since the "remainder" of the input word beyond the longest initial substring ("ime") was not found in the dictionary the remainder following the next-longest substring is sent from the Compound Parsing Algorithm 2 to the Word Decode Algorithm 3 for comparing to the words in Dictionary 4. In this case the next-longest substring is "over" and, thus, the remainder following this next-longest substring is "time". This remainder is found in Dictionary 4, and this fact is conveyed along the Substring Match line from the Word Decode Algorithm 3 to the Compound Parsing Algorithm Algorithm 2. Since both a substring at the beginning of the word and a substring consisting of the "remainder" of the word, beyond the substring at the beginning of the word, were found in the dictionary, the word "overtime" is considered to be a correctly spelled word and a signal indicating this is returned along the Verify line from the Compound Parsing Algorithm 2 to the Text Editor 1.

Figure 2:
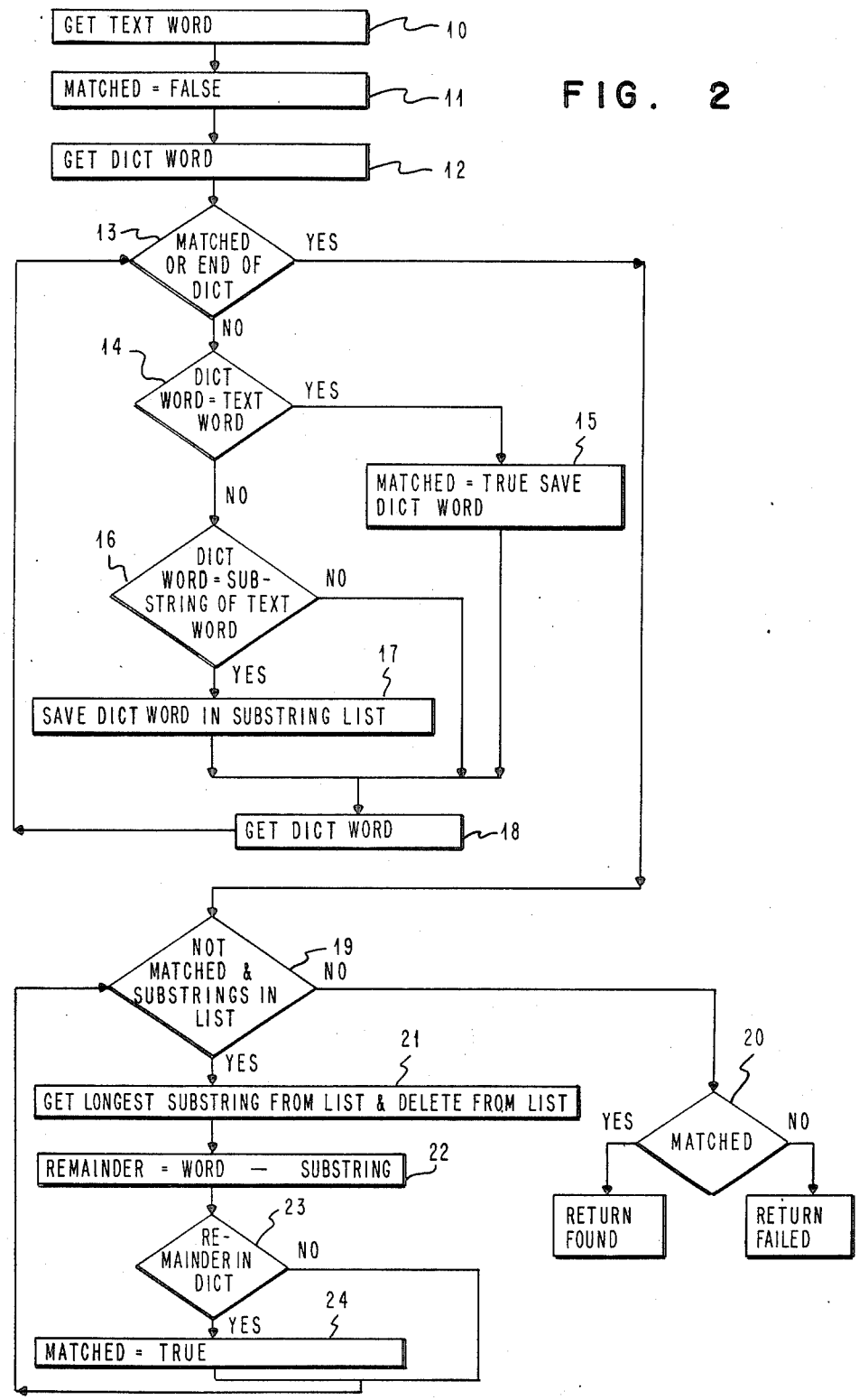
FIG. 2 is a detailed flow chart of the compound word spelling verification technique of this invention.

The detailed flow chart of the compound word spelling verification technique of this invention is shown in FIG. 2. The first step of this technique is to get a text word for verification as indicated at 10. Assume now that verification is being attempted for the compound word "overtime".

The flow chart of FIG. 2 has two major loops: A "look-up" loop and a "compound parsing" loop. Considering first the look-up loop, this loop compares dictionary entries to the input word. Dictionary entries which are substrings of the input word are "remembered" in a list. Before entering the look-up loop, a flag "matched", depicted at block 11, indicates whether the text word matches a dictionary entry. The "matched" flag is set to false to indicate that the text word has not yet been found in the dictionary. Next, the first relevant dictionary entry from the dictionary is accessed at 12. The first relevant word might be, for example, the first word in the dictionary beginning with the same alphabetic letter as the text word to be verified. To obtain greater speed at the expense of possible false alarms, the first relevant word to be accessed might be the first word beginning with the first three letters of the text word to be verified. In any case, if there are no more relevant words in the dictionary to access, the flag "end of dict" (end of dictionary) is set equal to true, instead. For example, if the first three letters of the input word are used to determine a relevant portion of the dictionary, the "end of dict" flag would be set when no more words with the same first three letters could be found in the dictionary.

Continuing in the look-up loop, if the "matched" or "end of dict" is set to true at this point, the word has been found in the dictionary or there were no more words in the dictionary to compare. The look-up loop is thus complete. Otherwise, the process continues, as it ordinarily would in the early stages of verification that have been described thus far.

Continuing in the look-up loop, at 14 the dictionary word most recently accessed is compared with the text word. If they are the same, the "matched" flag is set to true and this dictionary word is saved as indicated at 15. However, assuming that this first dictionary word accessed is not the text word to be verified, the operation proceeds to 16 where a test is performed to determine if the dictionary word is a substring of the text word. If so, the dictionary word is saved in a list of substrings of the text word, as indicated at 17. Thereafter, the next dictionary word in the dictionary is accessed and the test and comparisons of blocks 13, 14 and 16 continue while any dictionary words found to be substrings of the input text word are saved at 17.

Continuing with the example of attempting to verify "overtime", while assuming that the entire word "overtime" is not in the dictionary, the words "over" and "overt" are saved in the substring list. In this case, the look-up loop would eventually be exited out of block 13 as a result of reaching the end of the relevant portion of the dictionary. When the program exits this look-up loop, there is a list of substrings whose entries may be the first component in a compound word. In other cases in which the program exits this loop because the entire input text word was found in the dictionary, the word is presumed to be correctly spelled and no further processing takes place. In a case in which there is no match and also no list of possible compound components, the word is considered to be misspelled.

Returning to the case of verifying the word "overtime", the compound parsing loop is entered because there was no match but there is a list of possible compound components. The compound parsing loop looks at the list of possible components, also referred to as first elements, and attempts to find another dictionary entry such that the two may be joined to form the input text word. Accordingly, at 19 if the pair of conditions, "matched" equals false and "substrings in the list", do not both exist, the operation proceeds to block 20. If "matched" equals true, the word is considered correctly spelled, whereas if "matched" equals false, the word is considered misspelled if there are no substrings in the list from which to continue attempting spelling verification.

At block 19, if "matched" equals false and there are substrings in the list, the operation proceeds to 21 wherein the longest substring from the list is accessed and deleted from the list. Continuing with the example of "overtime" the longest substring is "overt". The remainder or second element of the word "overtime" is then processed at 22 to be "ime", based on the definition of the second element being the input text word "overtime" minus the just accessed longest substring "overt". Next, another look-up loop indicated at 23 and 24 is entered to determine if the remainder "ime" is in the dictionary. This look-up loop, as in the look-up loop described above, consists of looking at all relevant dictionary stems and setting a flag if the remainder "ime" matches a dictionary word.

If the remainder portion of the input text word matches a word in the dictionary, the input text word is considered a correctly spelled compound word made up of two correctly spelled dictionary entries. The flag "matched" is set to true. The operation returns to block 19 and proceeds to 20 for "matched" equals true. Continuing with the example of "overtime" at block 23, the remainder "ime" would not have been found in the dictionary. Thus, the operation would have returned to block 19 and proceeded to 21. In this case, "over" is now the longest substring in the list, and at 22 the remainder is now "time". Then, at 23 "time" will be found in the dictionary and "matched" will be set to true at 24 in this loop. Thus, the input text word "overtime" will be verified. For compounds consisting of more than two constituent words, the entire process may be applied recursively to each remainder.

A program design language listing is shown below which also describes this compound word spelling verification technique of this invention. This listing fully parallels the operation described above relative to the flow chart of FIG. 2.

```
FOR (all words in text)
{ get text word;
  matched = FALSE;
  get dictionary word;
  WHILE (NOT matched) AND (NOT end of dictionary)
  { IF (text word = dictionary word)
    THEN matched = TRUE;
    ELSE IF (dictionary word is a front
    substring of text word)
    THEN save dictionary word in
    substring list;
    get next dictionary word;
  }
  WHILE (NOT matched) AND (substrings in list)
  { extract longest front substring from list;
    back substring = text word − front substring;
    IF (back substring is in dictionary)
    THEN matched = TRUE;
  }
  IF (matched)
  THEN return(found);
  ELSE return(failed);
}
```

While the invention has been shown and described with reference to particular embodiments thereof, it will be understood by those skilled in the art that the foregoing and other changes in form and details may be made therein without departing from the spirit and scope of the invention. This process is independent of the specific methods of storage, organization, or access or any other particulars of the dictionary. Specifically, it is not necessary to store all inflected forms of each word in the dictionary, since means are well known in the prior art to generate the inflected from a basic dictionary.

We claim:

1. In a computer system including a dictionary against which text words are compared for spelling verification, a method of verifying the spelling of an input text compound word which word is not stored in said dictionary, comprising:

identifying a longest dictionary word which is an initial substring of said compound word;

determining a first remainder of said compound word which consists of that portion of said compound word succeeding said initial substring;

comparing said first remainder with said dictionary; and signaling that said compound word is correctly spelled if said first remainder is found in said dictionary.

2. In the method of claim 1, wherein said step of comparing said first remainder with said dictionary further comprises:

searching said dictionary and building a list of initial remainder substrings of said first remainder;

beginning with the longest of said initial remainder substrings, determining a second remainder of said longest of said initial remainder substrings; and signaling that said first remainder is found in said dictionary if said second remainder is found in said dictionary.

3. In a computer system including a dictionary against which text words are compared for spelling verification, a method of verifying the spelling of an input text compound word which word is not stored in said dictionary, comprising:

searching said dictionary and building a list of initial substrings of said compound word found in said dictionary;

beginning with the longest of said substrings, determining a first remainder of said word;

comparing said first remainder with said dictionary; and if said first remainder is not found in said dictionary, determining successively longer remainders which complement successively shorter ones of said substrings;

comparing said successively longer remainders with said dictionary until one of said successively longer remainders is found in said dictionary; and signaling that said compound word is correctly spelled upon said one of said successively longer remainders being found in said dictionary.

4. In the method of claim 3, further comprising signaling that said compound word is not correctly spelled if no remainder is found in said dictionary.

5. In the method of claim 3, wherein said step of comparing said first remainder with said dictionary further comprises:

searching said dictionary and building a list of initial remainder substrings of said first remainder, each of said initial remainder substrings consisting of a word found in both said dictionary and said first remainder;

beginning with the longest of said initial remainder substrings, determining a second remainder of said longest of said initial remainder substrings; and signaling that said first remainder is found in said dictionary if said second remainder is found in said dictionary.

6. In the method of claim 3, wherein said step of comparing each of said successively longer remainders further comprises:

for a shortest of said successively longer remainders, searching said dictionary and building a list of second initial substrings of said shortest of said successively longer remainders;

beginning with the longest of said second initial remainder substrings, determining a third remainder of said longest of said second initial remainder substrings; and signaling that said one of said successively longer remainders is found in said dictionary if said third remainder is found in said dictionary.

7. In the methods of claims 3, 4, 5, or 6 wherein said step of searching said dictionary further comprises:

searching only those words in said dictionary having a predetermined sequence of beginning letters which exactly match an equal length sequence of beginning letters of a substring or remainder being matched against the words in said dictionary.

8. In the method of claim 7 wherein the length of said predetermined sequence of beginning letters is two letters.

9. In the method of claim 7 wherein the length of said predetermined sequence of beginning letters is three letters.

* * * * *